United States Patent [19]

Romanelli

[11] Patent Number: 5,575,367
[45] Date of Patent: Nov. 19, 1996

[54] UNIFORM HIGH FORCE CLUTCH

[75] Inventor: Pat Romanelli, Harrington Park, N.J.

[73] Assignee: Mr. Gasket, Inc., Cleveland, Ohio

[21] Appl. No.: 509,335

[22] Filed: Jul. 31, 1995

[51] Int. Cl.$^6$ ............................ F16D 13/46; F16D 43/12
[52] U.S. Cl. ................ 192/52.4; 192/89.23; 192/105 C; 192/109 R
[58] Field of Search .............................. 192/52.4, 70.27, 192/70.29, 89.22, 89.23, 89.24, 103 A, 105 C, 109 R

[56] References Cited

U.S. PATENT DOCUMENTS

| | | |
|---|---|---|
| 2,021,973 | 11/1935 | Wemp . |
| 2,038,017 | 4/1936 | Wemp . |
| 2,109,420 | 2/1938 | Guernsey . |
| 2,162,873 | 6/1939 | Wolfram ............................ 192/103 A |
| 2,163,971 | 6/1939 | Zeidler . |
| 2,206,988 | 7/1940 | Wemp . |
| 2,427,346 | 9/1947 | Banker . |
| 2,657,781 | 11/1953 | Zeidler . |
| 2,885,047 | 5/1959 | Kehrl ............................ 192/105 C X |
| 3,266,330 | 8/1966 | Galleher . |
| 4,111,291 | 9/1978 | Horstman . |
| 4,425,991 | 1/1984 | Hays ..................................... 192/70.27 |
| 4,431,099 | 2/1984 | Jackson . |
| 5,284,234 | 2/1994 | Miglizzi . |

OTHER PUBLICATIONS

"Clutch & Flywheel Handbook" by Tom Monroe, published by H. P. Books (1977), pp. 1–49.

Primary Examiner—Richard M. Lorence
Attorney, Agent, or Firm—St. Onge Steward Johnston & Reens

[57] ABSTRACT

A centrifugally-assisted diaphragm clutch having a centrifugal weight pivotally mounted to the pressure plate which contacts the diaphragm spring. During rotation of the clutch, the centrifugal weight contacts and bears against the diaphragm spring exerting upward force on the diaphragm spring and downward force on the pressure plate, thereby increasing clutch pressure. The centrifugal weight also serves to distribute pressure over the pressure plate by directing force through its pivot point and by reducing the pressure applied to the pressure plate by the periphery of the diaphragm spring. The pressure plate includes a stop which limits the rotation of the centrifugal weight to prevent the clutch from locking in the engaged position.

14 Claims, 2 Drawing Sheets

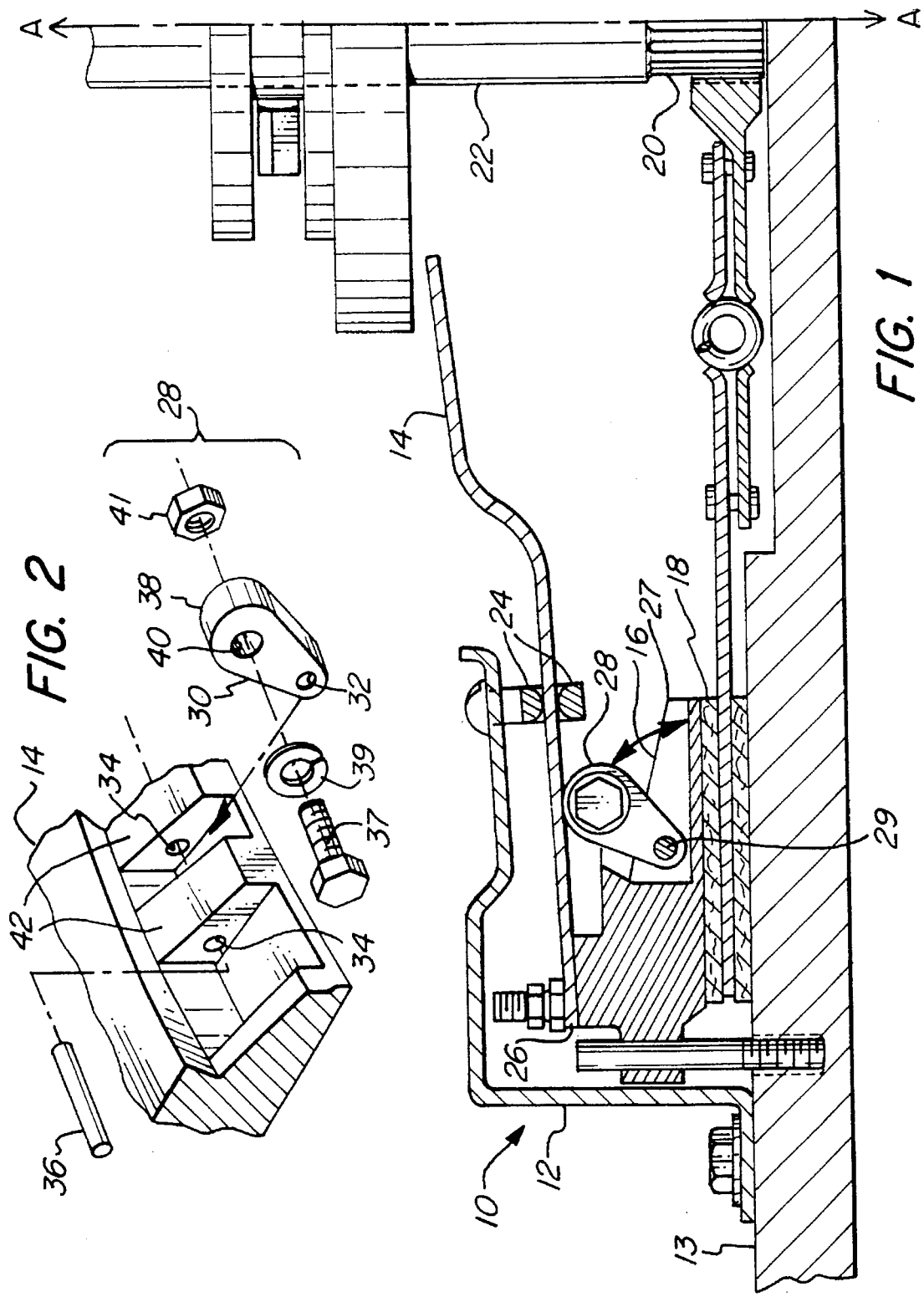

5,575,367

UNIFORM HIGH FORCE CLUTCH

FIELD OF THE INVENTION

The invention relates to a clutch device and, more specifically, to an automobile clutch utilizing centrifugal forces to increase and distribute pressure to the pressure plate with increasing engine speed.

BACKGROUND OF THE INVENTION

The use of centrifugal forces to increase the force exerted on pressure plates in clutches is well known in the art of clutch design of the Long-type and the Borg & Beck-type. In the Long-type clutches, centrifugal assistance ordinarily takes the form of weights added to the outward ends of release levers. For example, U.S. Pat. Nos. 2,021,973, 20038,017, and 2,206,988 to Wemp, and U.S. Pat. Nos. 2,163,971 and 2,657,781 to Zeidler disclose clutches of the Long-type which use coil springs (as the primary source of clutch pressure), and release levers with centrifugal weights (as a secondary source of clutch pressure). While these designs effectively increase the pressure exerted on a pressure plate, they do not provide for redistribution of the forces applied by the coil springs (which is desirable to reduce uneven wear, "hot spots" and slippage), and, moreover, these designs are not applicable to all other clutch designs.

Centrifugal weights have also been employed in the Borg & Beck type clutches. In these type of clutches, the centrifugal weights take the form of rollers which roll or slide on the surface of the pressure plate and contact the inside surface of the cover plate. As engine speed increases, the rollers move outward, wedging between the pressure plate and the cover, thereby applying pressure on the pressure plate. As with the Long-type clutches, these designs increase the pressure applied to the pressure plate, but they do not redistribute the forces applied to the pressure plate by the coil springs. Moreover, since the rollers are necessarily loose, they can disintegrate and fly free of the clutch in a "burst" situation.

A type of centrifugal weighting has also been used in the design of diaphragm clutches. In some diaphragm clutches centrifugal weights are affixed to the inner ends of the fingers of the diaphragm springs. The inner ends of the fingers of the spring are bent outward, thereby creating lever arms between the ends of the springs and the fulcrum rings. The centrifugal force generated by the ends of the spring fingers is magnified by this lever arm and acts on the pressure plate. While this design provides for some centrifugal loading, it necessarily does not add a significant amount of centrifugal assist. Moreover, it does not redistribute the forces applied to the pressure plate by the spring.

What is desired, therefore, is a clutch design having a centrifugal assist which distributes the forces applied by the spring, which increases the total forces applied to the pressure plate, and which is highly efficient and safe with a minimum of parts to eliminate possible disintegration.

SUMMARY OF THE INVENTION

Accordingly, it is an object of the invention to provide a clutch employing centrifugal loading.

It is another object of the invention to provide centrifugal assistance to a diaphragm clutch.

It is another object of the invention to provide a centrifugally-assisted clutch having the above characteristics with a means to change the distribution of the pressure applied to a pressure plate by the diaphragm spring.

It is yet another object of the invention to provide a centrifugally-assisted clutch having the above characteristics with a centrifugal weight pivotally-mounted to the pressure plate and contacting the diaphragm spring.

It is another object of the invention to provide a centrifugally-assisted clutch having the above characteristics where the centrifugal weight contacts and bears against the diaphragm spring between the periphery thereof and the fulcrum rings.

It is still another object of the invention to provide a clutch of the above characteristics with a stop to limit the pivoting of the centrifugal weight with respect to the pressure plate.

The present invention comprises a centrifugally-assisted clutch having a cover, a diaphragm spring connected to the cover, and a pressure plate affixed to the diaphragm spring. A centrifugal weight, pivotally mounted to the pressure plate, contacts and bears against the diaphragm spring when the clutch rotates thereby providing increased clutch pressure. A stop limits the pivoting of the centrifugal weight to prevent the clutch from locking in the engaged position.

The invention and its particular features and advantages will become more apparent from the following detailed description considered with reference to the accompanying drawings.

BRIEF DESCRIPTION OF THE DRAWINGS

FIG. 1 is a cross-sectional elevation view of the clutch of the present invention showing a centrifugal weight pivotally-mounted to the pressure plate and contacting the diaphragm spring.

FIG. 2 is an exploded perspective view of the centrifugal weight in FIG. 1 showing the method of attachment to the pressure plate.

DETAILED DESCRIPTION OF THE INVENTION

Figure 3:
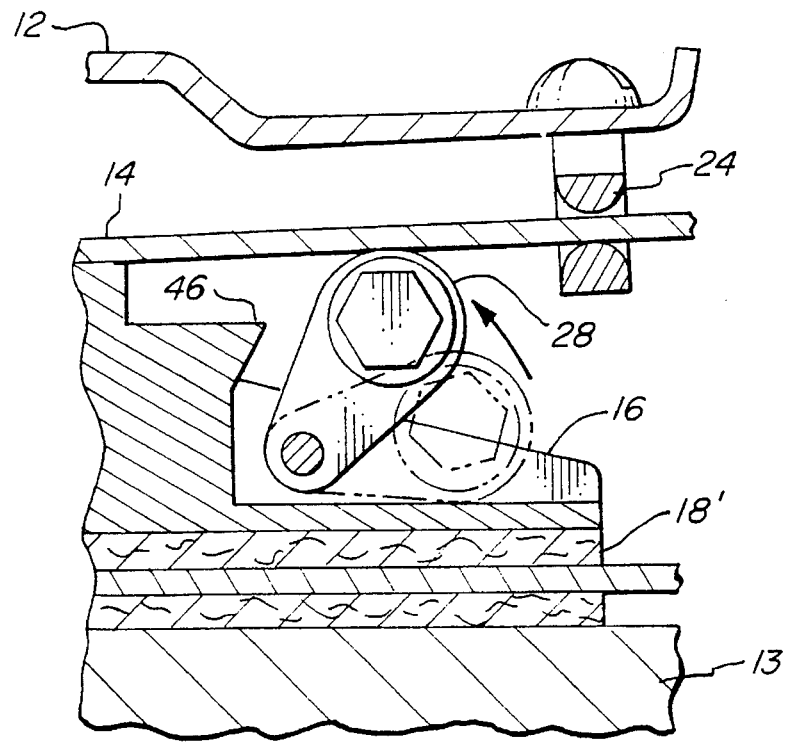
FIG. 3 is a close-up cross-sectional elevation view of the centrifugal weight showing its contact position when the clutch plate is unworn.

Referring to FIG. 1–4, the clutch assembly 10 includes a cover 12 connected to a flywheel 13, a diaphragm spring 14 connected to the cover 12, and a pressure plate 16 connected to the diaphragm spring 14. The pressure plate 16 exerts pressure on a clutch plate 18 thereby transferring torque from the flywheel 13 to the spline 20 and the drive shaft 22.

In the preferred embodiment, the diaphragm spring 14 is pivotally attached to the cover plate 12 by fulcrum rings 24, however, as is well known in the art, diaphragm spring 14 may be attached by other means such as bolts or rivets. Also, preferably, the pressure plate 16 is attached to the periphery 26 of the diaphragm spring 14, but as is also known in the art, the pressure plate 16 may also be attached to interior portions of the diaphragm spring 14.

A centrifugal weight 28 is pivotally attached to the pressure plate 16. The centrifugal weight 28 has a first position (shown in phantom lines in FIG. 3) in which it is not in contact with the diaphragm spring 14, and a second position in which it is in contact with and bears against the diaphragm spring 14. The rotation of the clutch assembly 10 about the axis A—A produces centrifugal force which moves the centrifugal weight 28 into the second position in contact with and bearing against the diaphragm spring 14 to provide an increased clutch pressure.

The centrifugal weight 28 is pivotally attached to the pressure plate 16 between an outer periphery 26 of the diaphragm spring 14 and an inner periphery 27 of the pressure plate 16. The centrifugal weight 28 contacts the diaphragm spring 14 between the outer periphery 26 thereof and the fulcrum rings 24.

The centrifugal weight 28 serves to increase the clutch pressure because, during rotation of the clutch 10, the centrifugal weight 28 pivots into contact with the diaphragm spring 14 and bears against the diaphragm spring 14 and the pressure plate 16 thereby exerting upward force on the diaphragm spring 14 and downward force on the pressure plate 16.

The centrifugal weight 28 also serves to change the distribution of the force applied to the pressure plate 16 by the diaphragm spring 14. This is because the force exerted on the pressure plate 16 through the centrifugal weight 28 is through the pivot pin 29 located near the center of the pressure plate. Moreover, the force applied by the centrifugal weight 28 to the diaphragm spring 14 between its periphery 26 and the fulcrum rings 24 serves to reduce the force applied to the pressure plate 16 by the outer periphery 26 of the diaphragm spring 14. While the centrifugal weight 28 reduces the force applied to the pressure plate 16 by the outer periphery 26 of the diaphragm spring 14, it is important to note that the result is always a net increase in total clutch pressure. This is due to the fact that upward force on the diaphragm spring 14 generated by the centrifugal weight is acting with less of a moment with respect to the fulcrum rings 24 as compared to the upward force exerted on the outer periphery 26 of the diaphragm spring 14 by the pressure plate 16. Thus, the centrifugal weight 28 serves to decrease the pressure applied to the pressure plate 16 at the location of the outer periphery 26 of the diaphragm spring 14 while simultaneously increasing total clutch pressure.

Referring to FIG. 2, the centrifugal weight 28 may consist of a rigid bar 30 having a pivot hole 32. The pressure plate 14 may include pivot pin sockets 34 to receive a pivot pin 36 which extends through the pivot hole 32 in the rigid bar 30. The centrifugal weight 28 may also include a means to adjust the weight thereof. This means may be comprised of a weight added to the free end 38 of the centrifugal weight 28. Preferably this means consists of a simple nut, washer and bolt 37, 39, 41 combination which extends through a bolt hole 40 in the free end 38 of the centrifugal weight 28.

The pivot pin sockets 34 may be contained within walls 42 of a guiding groove 44. The walls 42 of the guiding groove 44 help to support the centrifugal weight 28 during angular acceleration of the clutch assembly 10.

Figure 4:
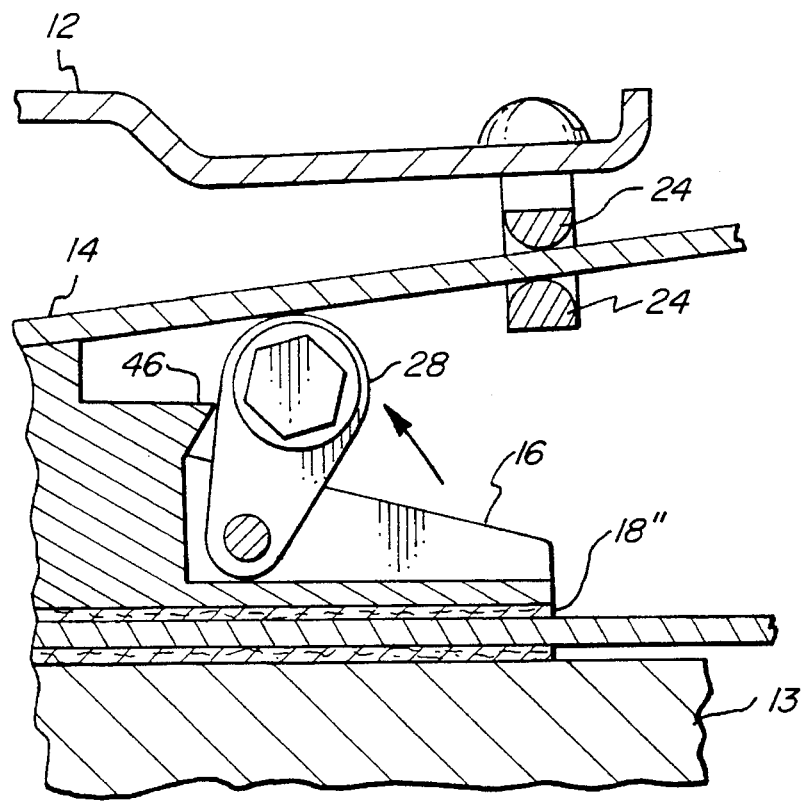
FIG. 4 is a close-up cross-sectional elevation view of the centrifugal weight of FIG. 3 showing its limited position when the clutch plate is worn.

Referring to FIG. 3, the pressure plate 16 may include a stop 46 which serves to limit the pivoting of the centrifugal weight 28. During normal operation, the stop 46 does not interfere with the movement of the centrifugal weight 28. Referring to FIG. 4, if the centrifugal weight 28 rotates to a nearly upright position, the centrifugal weight 28 contacts the stop 46 which prevents any further pivoting away from the center of rotation. This prevents the centrifugal weight 28 from becoming permanently wedged under the diaphragm spring 14 which would prevent the full release of the clutch 10.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A centrifugally-assisted clutch comprising:

a cover;

a diaphragm spring; said diaphragm spring being connected to said cover;

a pressure plate affixed to said diaphragm spring whereby said spring provides a clamping force to said pressure plate; and a centrifugal weight having first and second end portions; said first end portion being pivotally mounted to said pressure plate; said second end portion being movable between a first position and a second position, wherein, in said second position, said second end of said centrifugal weight is in contact with said diaphragm spring.

2. A centrifugally-assisted clutch in accordance with as in claim 1, further comprising:

a fulcrum means connecting said diaphragm spring to said cover;

said diaphragm spring having an outer periphery;

said pressure plate having an inner periphery; said pressure plate being affixed to said outer periphery of said diaphragm spring; and said second end portion of said centrifugal weight contacting said diaphragm spring between said fulcrum means and said outside periphery thereof when said centrifugal weight is in said second position.

3. A centrifugally-assisted clutch in accordance with claim 2, wherein said centrifugal weight is pivotally mounted to said pressure plate between said outer periphery of said diaphragm spring and said inner periphery of said pressure plate.

4. A centrifugally-assisted clutch in accordance with claim 1, wherein said centrifugal weight is movable between said first and second positions by rotation of the clutch; said rotation of the clutch causing said centrifugal weight to bear against said diaphragm spring to provide an increased clamping force of said pressure plate.

5. A centrifugally-assisted clutch in accordance with claim 2, wherein said centrifugal weight is movable between said first and second positions by rotation of the clutch; said rotation of the clutch causing said centrifugal weight to bear against said diaphragm spring to provide an increased clamping force of said pressure plate.

6. A centrifugally-assisted clutch in accordance with claim 3, wherein said centrifugal weight is movable between said first and second positions by rotation of the clutch; said rotation of the clutch causing said centrifugal weight to bear against said diaphragm spring to provide an increased clamping force of said pressure plate.

7. A centrifugally-assisted clutch in accordance with claims 1, 2, 3, 4, 5, or 6, further comprising a means to limit the movement of said centrifugal weight.

8. A centrifugally-assisted clutch in accordance with claim 7, wherein said means to limit the movement of said centrifugal weight further comprises a stop to limit the pivoting of said centrifugal weight.

9. A centrifugally-assisted clutch in accordance with claim 8, wherein said stop prevents pivoting of said centrifugal weight to an upright position.

10. A centrifugally-assisted clutch in accordance with claim 7, where said means to limit the movement of said centrifugal weight further comprises a guiding groove in said pressure plate; said guiding groove having two side walls and an end wall; said end wall acting as a stop to limit the pivoting of said centrifugal weight.

11. A centrifugally-assisted clutch in accordance with claim 7, wherein said centrifugal weight further comprises a bar having a pivot hole; wherein said pressure plate further comprises pivot pin sockets; and further comprising a pivot pin extending through said pivot hole and into said pivot pin sockets to pivotally retain said centrifugal weight.

12. A centrifugally-assisted clutch in accordance with claim 8, wherein said centrifugal weight further comprises a bar having a pivot hole; wherein said pressure plate further comprises pivot pin sockets; and further comprising a pivot pin extending through said pivot hole and into said pivot pin sockets to pivotally retain said centrifugal weight.

13. A centrifugally-assisted clutch in accordance with claim 9, wherein said centrifugal weight further comprises a bar having a pivot hole; wherein said pressure plate further comprises pivot pin sockets; and further comprising a pivot pin extending through said pivot hole and into said pivot pin sockets to pivotally retain said centrifugal weight.

14. A centrifugally-assisted clutch in accordance with claim 10, wherein said centrifugal weight further comprises a bar having a pivot hole; wherein said pressure plate further comprises pivot pin sockets; and further comprising a pivot pin extending through said pivot hole and into said pivot pin sockets to pivotally retain said centrifugal weight.

\* \* \* \* \*